United States Patent
Hsieh et al.

(10) Patent No.: US 10,571,789 B2
(45) Date of Patent: Feb. 25, 2020

(54) WAVELENGTH CONVERSION ELEMENT AND FORMING METHOD THEREOF, WAVELENGTH CONVERSION MODULE, AND PROJECTION DEVICE

(71) Applicant: Coretronic Corporation, Hsin-Chu (TW)

(72) Inventors: Chi-Tang Hsieh, Hsin-Chu (TW); Jo-Han Hsu, Hsin-Chu (TW); I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/299,146

(22) Filed: Mar. 12, 2019

(65) Prior Publication Data
US 2019/0346751 A1    Nov. 14, 2019

(30) Foreign Application Priority Data
May 14, 2018 (CN) .......................... 2018 1 0454611

(51) Int. Cl.
*G03B 21/20* (2006.01)
*C09K 11/02* (2006.01)

(52) U.S. Cl.
CPC .......... *G03B 21/204* (2013.01); *C09K 11/02* (2013.01)

(58) Field of Classification Search
CPC ...... G03B 21/204; G03B 33/00; C09K 11/02; F21K 9/60; F21K 9/64; F21V 9/32; H04N 9/3197; H01L 33/50
See application file for complete search history.

(56) References Cited

U.S. PATENT DOCUMENTS

| | | | |
|---|---|---|---|
| 2014/0220352 A1* | 8/2014 | Gross | G02B 5/23 428/411.1 |
| 2017/0153535 A1* | 6/2017 | Lin | G03B 21/204 |
| 2017/0271562 A1* | 9/2017 | Wang | H01L 33/60 |

FOREIGN PATENT DOCUMENTS

| | | |
|---|---|---|
| CN | 101180557 | 5/2008 |
| CN | 104736930 | 6/2015 |
| CN | 106206904 | 12/2016 |
| CN | 107255865 | 10/2017 |
| TW | I572066 | 2/2017 |

* cited by examiner

*Primary Examiner* — Joseph L Williams
*Assistant Examiner* — Jose M Diaz
(74) *Attorney, Agent, or Firm* — JCIPRNET

(57) ABSTRACT

A wavelength conversion element, a forming method of the wavelength conversion element, a wavelength conversion module and a projection device are provided. The wavelength conversion element includes a wavelength conversion material, a binder, a filling material and a plurality of cavities. The wavelength conversion material is dispersed in the binder to form a wavelength conversion layer. The filling material is located in the wavelength conversion layer. The cavities are located in the wavelength conversion layer, wherein the filling material fills some of the cavities. The wavelength conversion module includes a substrate and the above wavelength conversion element. The projection device includes the above wavelength conversion module, an excitation light source, a light valve and a projection lens. The disclosure enables the projection device to have good conversion efficiency and reliability.

25 Claims, 3 Drawing Sheets

WAVELENGTH CONVERSION ELEMENT AND FORMING METHOD THEREOF, WAVELENGTH CONVERSION MODULE, AND PROJECTION DEVICE

CROSS-REFERENCE TO RELATED APPLICATION

This application claims the priority benefit of China application serial no. 201810454611.1, filed on May 14, 2018. The entirety of the above-mentioned patent application is hereby incorporated by reference herein and made a part of this specification.

BACKGROUND

Technical Field

The disclosure relates to an optical element, a forming method thereof, and an optical device including the above optical element, and more particularly, to a wavelength conversion element, a forming method of a wavelength conversion element, a wavelength conversion module, and a projection device.

Related Art

Recently, projection devices mainly using solid-state light sources such as light-emitting diodes (LEDs) and laser diodes are gaining an increasing market share. Since laser diodes have about 20% higher light emitting efficiency than LEDs, in order to go beyond the light source limitations of LEDs, it has gradually been developed that laser light sources are used as an excitation light source for exciting phosphor powder to produce pure color light required by projectors.

Generally speaking, in an existing phosphor wheel manufacturing process, a mixture of phosphor powder and silicone is coated on a substrate of the phosphor wheel. However, silicone is characterized as being not high-temperature resistant and may be degraded under high temperature. Thus, when the phosphor wheel is irradiated with laser light for a long time, the silicone is likely to be degraded or damaged since it cannot tolerate high temperature, which may affect light emitting efficiency and reliability of the phosphor wheel. Meanwhile, in another phosphor wheel manufacturing process, glass glue is used in place of silicone to be mixed with phosphor powder. The phosphor wheel formed by this manufacturing process has better thermal conductivity and heat resistance; however, cavities are likely to form in a wavelength conversion area (phosphor layer) on the phosphor wheel. The volume percentage occupied by these cavities in the wavelength conversion area varies depending on difference in phosphor powder concentration. As the phosphor powder concentration increases, the volume percentage occupied by the cavities increases, and conversion efficiency of the phosphor wheel in producing color light is thus affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion element having good conversion efficiency and reliability.

The disclosure provides a wavelength conversion module having good conversion efficiency and reliability.

The disclosure provides a projection device having good optical quality and reliability.

The disclosure provides a forming method of a wavelength conversion element, capable of forming a wavelength conversion module having good conversion efficiency and reliability.

Other objectives and advantages of the disclosure may be further understood from the technical features disclosed in the disclosure.

To achieve one of, some of or all of the above objectives or other objectives, an embodiment of the disclosure proposes a wavelength conversion element. The wavelength conversion element includes a wavelength conversion material, a binder, a filling material and a plurality of cavities. The wavelength conversion material is dispersed in the binder to form a wavelength conversion layer. The filling material is located in the wavelength conversion layer. The cavities are located in the wavelength conversion layer, wherein the filling material fills some of the cavities.

To achieve one of, some of or all of the above objectives or other objectives, an embodiment of the disclosure proposes a wavelength conversion module. The wavelength conversion module includes a substrate and at least one wavelength conversion element as described above. The at least one wavelength conversion element is located on the substrate. The at least one wavelength conversion element includes a wavelength conversion material, a binder, a filling material and a plurality of cavities. The wavelength conversion material is dispersed in the binder to form a wavelength conversion layer. The filling material is located in the wavelength conversion layer. The cavities are located in the wavelength conversion layer, wherein the filling material fills some of the cavities.

To achieve one of, some of or all of the above objectives or other objectives, an embodiment of the disclosure proposes a projection device. The projection device includes the above wavelength conversion module, an excitation light source, a light valve and a projection lens. The wavelength conversion module has at least one wavelength conversion optical region, and the at least one wavelength conversion element is disposed correspondingly on the at least one wavelength conversion optical region. The at least one wavelength conversion element includes a wavelength conversion material, a binder, a filling material and a plurality of cavities. The wavelength conversion material is dispersed in the binder to form a wavelength conversion layer. The filling material is located in the wavelength conversion layer. The cavities are located in the wavelength conversion layer, wherein the filling material fills some of the cavities. The excitation light source is configured to emit an excitation beam, wherein the excitation beam is transmitted to the wavelength conversion module and is converted into an illumination beam through the wavelength conversion module. The light valve is located on a transmission path of the illumination beam and is configured to convert the illumination beam into an image beam. The projection lens is located on a transmission path of the image beam and is configured to convert the image beam into a projection beam.

To achieve one of, some of or all of the above objectives or other objectives, an embodiment of the disclosure proposes a forming method of a wavelength conversion element, the forming method including the following steps. A wavelength conversion material and a binder are provided, wherein the wavelength conversion material is dispersed in the binder. The wavelength conversion material and the binder are cured to form a wavelength conversion layer, wherein a plurality of cavities is formed in the wavelength conversion layer. A filling material is injected into the wavelength conversion layer to fill some of the cavities. The filling material in the wavelength conversion layer is cured.

Based on the above, the embodiments of the disclosure at least have one of the following advantages or effects. In the embodiments of the disclosure, by selecting the materials of the binder and the filling material of the wavelength conversion element, thermal conductivity, heat resistance and reliability of the wavelength conversion element can be improved. Moreover, in the wavelength conversion element, by the filling material that fills the cavities, good conversion efficiency of the wavelength conversion layer can be maintained. In addition, the wavelength conversion module and the projection device which use the above wavelength conversion element can thus have good reliability and conversion efficiency as well. In the forming method of a wavelength conversion element according to the embodiments of the disclosure, the wavelength conversion element formed by the manufacturing process in which the filling material is added can have good reliability and conversion efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
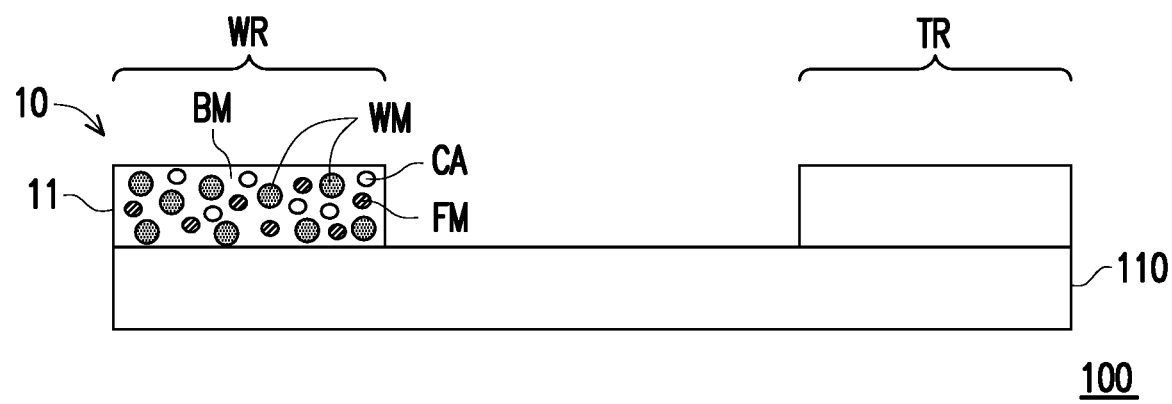
FIG. 1A is a schematic cross-sectional view of a wavelength conversion module according to an embodiment of the disclosure.
Figure 1B:
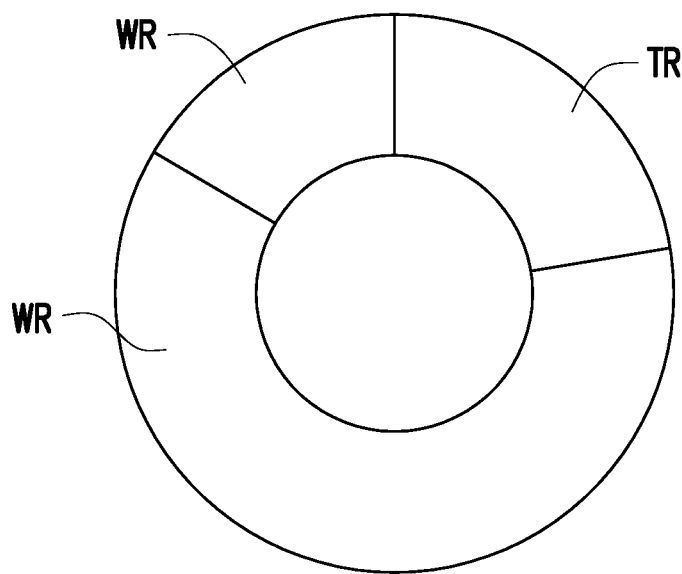
FIG. 1B is a top view of the wavelength conversion module in FIG. 1A.

FIG. 1A is a schematic cross-sectional view of a wavelength conversion module according to an embodiment of the disclosure. FIG. 1B is a top view of the wavelength conversion module in FIG. 1A. Referring to FIG. 1A and FIG. 1B, a wavelength conversion module 100 of the present embodiment has at least one wavelength conversion optical region WR and an optical region TR, and the wavelength conversion module 100 includes a substrate 110 and at least one wavelength conversion element 10. Specifically, as shown in FIG. 1A, in the present embodiment, the at least one wavelength conversion element 10 is located on the substrate 110 and is disposed correspondingly on the at least one wavelength conversion optical region WR. It is worth mentioning that the optical region TR is, for example, a light passing-through area or an opening of the wavelength conversion module 100 for allowing an excitation beam to pass therethrough. In another embodiment, the optical region TR is, for example, a reflection area for reflecting the excitation beam.

Specifically, as shown in FIG. 1A, in the present embodiment, the wavelength conversion element 10 includes a wavelength conversion material WM, a binder BM, a filling material FM and a plurality of cavities CA. The wavelength conversion material WM is uniformly dispersed in the binder BM to form a wavelength conversion layer 11. For example, in the present embodiment, a material of the binder BM may contain silicon dioxide, and the binder BM has thermal conductivity of greater than 0.2 W/m-k. In this way, the thus formed wavelength conversion layer 11 may have good thermal conductivity, heat resistance and reliability, and is capable of receiving energy provided by larger laser light. For example, the wavelength conversion element 10 is capable of receiving the energy of laser light having an energy density of greater than 150 W/mm². It should be noted that the numerical ranges mentioned herein are only for illustrative purposes and are not used to limit the disclosure.

However, in the process of forming the wavelength conversion layer 11 by the wavelength conversion material WM and the binder BM, the cavities CA are also formed in the wavelength conversion layer 11, and the filling material FM is thus needed to fill the cavities CA. Specifically, as shown in FIG. 1A, in the present embodiment, the filling material FM is located in the wavelength conversion layer 11 and fills some of the cavities CA, which can thus reduce the volume percentage occupied by the cavities CA in the wavelength conversion layer 11. For example, since the filling material FM fills some of the cavities CA, the volume percentage occupied by the other cavities CA (i.e., the cavities CA containing air) in the wavelength conversion layer 11 may be reduced to 10% or lower. It should be noted that the numerical ranges mentioned herein are only for illustrative purposes and are not used to limit the disclosure.

For example, as shown in FIG. 1A, in the present embodiment, the filling material FM of the wavelength conversion element 10 has a greater refractive index than air, and conversion efficiency can thus be enhanced. In other words, in the present embodiment, the refractive index of the filling material FM is greater than 1. More in detail, in the present embodiment, the refractive index of the filling material FM ranges from 1 to 1.8. It should be noted that the numerical ranges mentioned herein are only for illustrative purposes and are not used to limit the disclosure.

In another aspect, in the present embodiment, the materials of the filling material FM and the binder BM can be correspondingly selected based on requirements of the manufacturing process or the product. For example, the same material or different materials may be selected for the filling material FM and the binder BM according to the manufacturing process and component compatibility, so as to reduce as much as possible the volume percentage occupied by the cavities CA in the wavelength conversion layer 11. In different embodiments, the refractive index of the filling material FM and the refractive index of the binder BM may be set to be the same as or different from each other according to the manufacturing process and component compatibility, so as to optimize the conversion efficiency of the wavelength conversion element 10.

In the following, simulation data of a comparative example and examples of the wavelength conversion element 10 will be mentioned. However, the simulation data mentioned in the following is not intended to limit the disclosure. Any person skilled in the art may refer to the disclosure and make appropriate changes to parameters or settings thereof and the changes should still fall within the scope of the disclosure.

TABLE 1

| | Conversion efficiency | | |
|---|---|---|---|
| Refractive index of binder | Comparative Example (without filling material) | Example 1 (refractive index of filling material is 1.4) | Example 2 (refractive index of filling material is 1.5) |
| 1.4 | 50.09% | 53.22% | 52.73% |
| 1.5 | 50.10% | 53.33% | 53.54% |
| 1.6 | 50.06% | 53.11% | 53.45% |
| 1.7 | 50.00% | 52.53% | 53.12% |

Specifically, in a comparative example, the refractive index of the binder BM is 1.4 to 1.7. In the thus formed wavelength conversion layer 11, the volume percentage occupied by the cavities CA in the wavelength conversion layer 11 is roughly 10% during the manufacturing process. Data of conversion efficiency of the wavelength conversion element 10 is subjected to simulation analysis and the result thereof is as shown in the column of Comparative Example in Table 1. In an example, the refractive index of the filling material FM filling some of the cavities CA is 1.4. Data of conversion efficiency of the wavelength conversion element 10 is subjected to simulation analysis and the result thereof is as shown in the column of Example 1 in Table 1. In another example, the refractive index of the filling material FM filling some of the cavities CA is 1.5. Data of conversion efficiency of the wavelength conversion element 10 is subjected to simulation analysis and the result thereof is as shown in the column of Example 2 in Table 1. In detail, as shown in Table 1, the conversion efficiency of the wavelength conversion element 10 of Examples 1 and 2 is obviously improved as compared to the wavelength conversion element 10 of Comparative Example. It should be noted that the numerical ranges mentioned herein are only for illustrative purposes and are not used to limit the disclosure.

In this way, by selecting the materials of the binder BM and the filling material FM of the wavelength conversion element 10, thermal conductivity, heat resistance and reliability of the wavelength conversion element 10 can be improved. Moreover, in the wavelength conversion element 10, by the filling material FM that fills the cavities CA, good conversion efficiency of the wavelength conversion layer 11 can be maintained. In addition, the wavelength conversion module 100 using the above wavelength conversion element 10 can thus have good reliability and conversion efficiency as well.

A manufacturing process of the wavelength conversion module 100 will be described further below with reference to FIG. 2.

Figure 2:
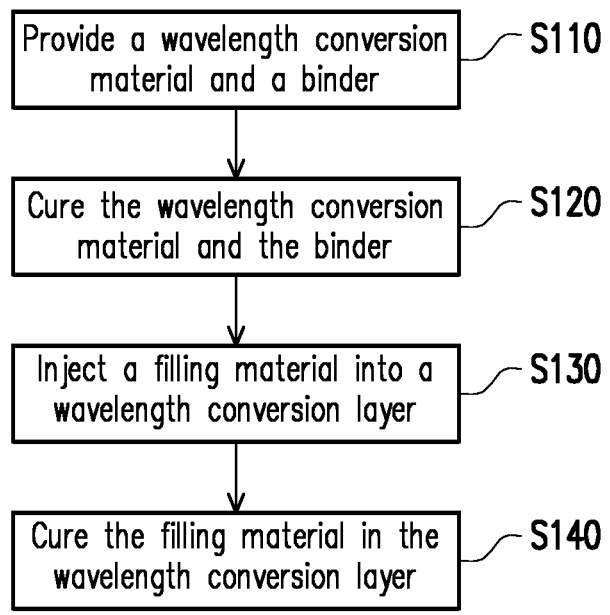
FIG. 2 is a flowchart of a manufacturing process of a wavelength conversion module according to an embodiment of the disclosure.

FIG. 2 is a flowchart of a manufacturing process of a wavelength conversion module according to an embodiment of the disclosure. Referring to FIG. 1A and FIG. 2, firstly, step S110 is performed in which a wavelength conversion material WM and a binder BM are provided, wherein the wavelength conversion material WM is uniformly dispersed in the binder BM. Next, step S120 is performed in which the wavelength conversion material WM and the binder BM are cured to form a wavelength conversion layer 11. Specifically, a plurality of cavities CA is formed in the currently formed wavelength conversion layer 11. Next, step S130 is performed in which a filling material FM is injected into the wavelength conversion layer 11 to fill some of the cavities CA. For example, the wavelength conversion layer 11 is immersed in a solution containing the filling material FM so that the filling material FM can permeate into some of the cavities CA. Next, step S140 is performed in which the filling material FM in the wavelength conversion layer 11 is cured. More specifically, the completed wavelength conversion layer 11 may be stuck onto the substrate 110 by a heat conductive glue.

In this way, the wavelength conversion element 10 in the aforesaid FIG. 1A can be formed. In the present embodiment, by the wavelength conversion element 10 formed by the manufacturing process in which the filling material FM is added, the wavelength conversion element 10 can have good reliability and conversion efficiency.

Figure 3:
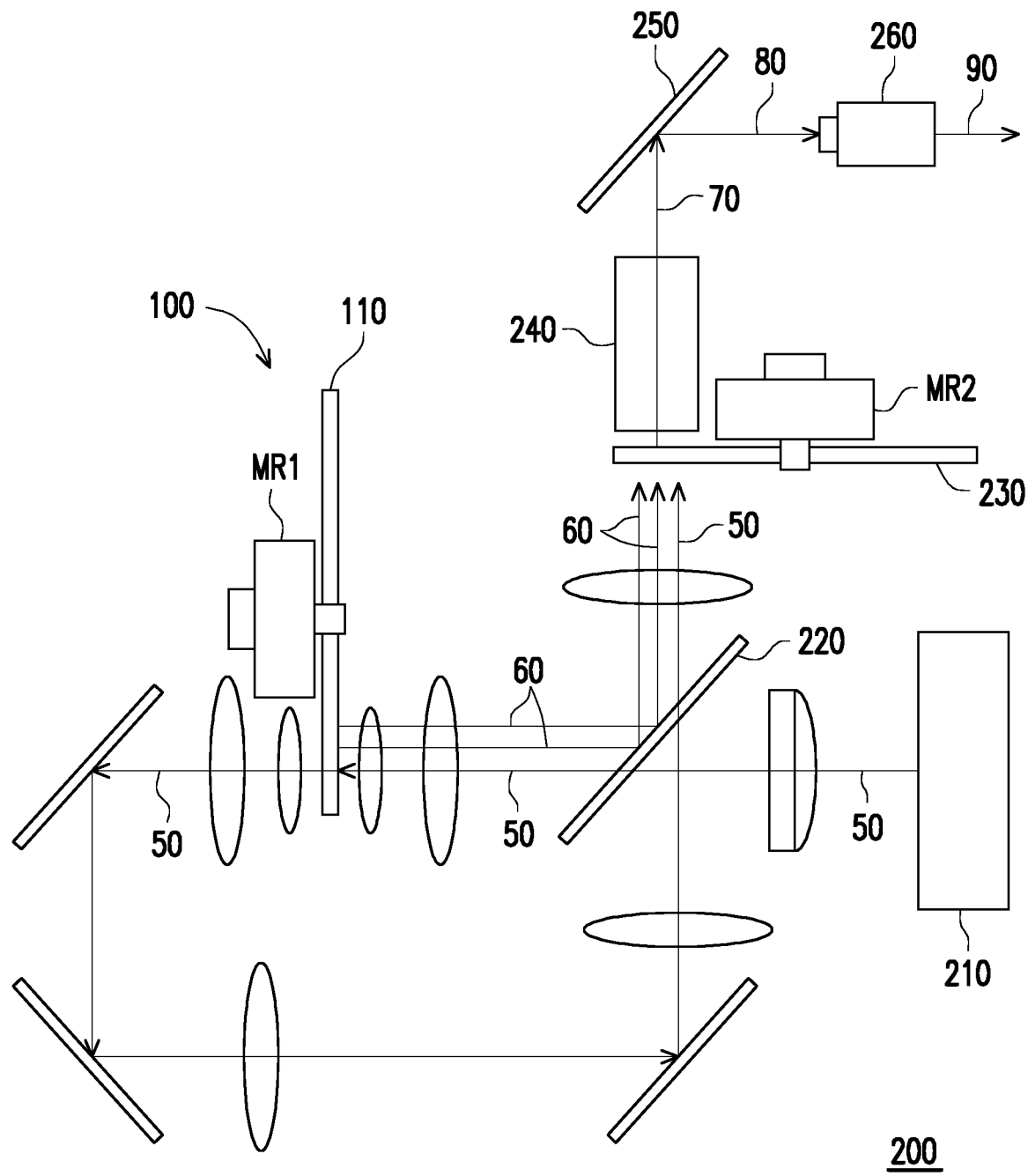
FIG. 3 is a schematic view of an architecture of a projection device according to an embodiment of the disclosure.

FIG. 3 is a schematic view of an architecture of a projection device according to an embodiment of the disclosure. However, the disclosure is not limited thereto. Referring to FIG. 1A and FIG. 3, a projection device 200 includes an excitation light source 210, a beam splitting unit 220, a wavelength conversion module 100 including the wavelength conversion element 10, a light valve 250 and a projection lens 260. In the present embodiment, the structures of the wavelength conversion element 10 and the wavelength conversion module 100 have been described in detail in the preceding text and will not be repeated. In the present embodiment, the light valve 250 is, for example, a digital micro-mirror device (DMD) or a liquid-crystal-on-silicon panel (LCOS panel). However, in other embodiments, the light valve 250 may be a transmissive liquid crystal panel or other light beam modulator.

As shown in FIG. 3, in the present embodiment, the excitation light source 210 is configured to emit an excitation beam 50. In the present embodiment, the excitation light source 210 is a laser light source, and the excitation beam 50 is a laser beam. For example, the excitation light source 210 may include a plurality of blue laser diodes (not illustrated) arranged in array. However, the disclosure is not limited thereto.

Specifically, as shown in FIG. 3, in the present embodiment, the beam splitting unit 220 is disposed on a transmission path of the excitation beam 50 and is located between the excitation light source 210 and the wavelength conversion module 100. Specifically, the beam splitting unit 220 may be a partially transmissive, partially reflective element, a dichroic element, a polarization beam splitter element or any other element capable of splitting a light beam. For example, in the present embodiment, the beam splitting unit 220 may allow a blue beam to pass therethrough and reflect beams of other colors (e.g., red, green, yellow and so on). That is, the beam splitting unit 220 may allow the excitation beam 50 in blue color to pass therethrough. In this way, the excitation beam 50 may pass through the beam splitting unit 220 and be incident to the wavelength conversion module 100.

For example, as shown in FIG. 1A, FIG. 1B and FIG. 3, the wavelength conversion module 100 is located on the transmission path of the excitation beam 50. Moreover, at least one wavelength conversion optical region WR of the wavelength conversion module 100 is configured to convert the excitation beam 50 into at least one converted beam 60. The optical region TR of the wavelength conversion module 100 is configured to allow the excitation beam 50 to pass therethrough to be transmitted to a subsequent optical element (e.g., a plurality of reflective mirrors). In addition, the wavelength conversion module 100 further includes a first actuator MR1 configured to cause the optical region TR and the at least one wavelength conversion optical region WR to enter the transmission path of the excitation beam 50 during different periods. Thus, the excitation beam 50 is selectively passed or converted into the at least one converted beam 60.

For example, as shown in FIG. 3, the projection device 200 further includes a filter module (filter wheel) 230. The filter module 230 is located on a transmission path of the excitation beam 50 and the converted beam 60, and has a filtering area and a light transmissive area (both not illustrated). The filter module 230 further includes a second actuator MR2 configured to cause the filtering area (not illustrated) to correspondingly enter the transmission path of the converted beam 60 during different periods, so as to form red light and green light respectively. In another aspect, during different periods, the light transmissive area (not illustrated) also correspondingly enters the transmission path of the excitation beam 50 transmitted to the filter module 230, so as to form blue light. In this way, the excitation beam 50 and the converted beam 60 can form an illumination beam 70 in a time sequence.

In another aspect, as shown in FIG. 3, in the present embodiment, the projection device 200 further includes a light homogenizing element 240 located on a transmission path of the illumination beam 70. In the present embodiment, the light homogenizing element 240 includes an integration rod. However, the disclosure is not limited thereto. More in detail, as shown in FIG. 3, when the illumination beam 70 is transmitted to the light homogenizing element 240 via an illumination system, the light homogenizing element 240 homogenizes the illumination beam 70 and transmits the same to the light valve 250.

Next, as shown in FIG. 3, the light valve 250 is located on the transmission path of the illumination beam 70 and is configured to convert the illumination beam 70 into an image beam 80. The projection lens 260 is located on a transmission path of the image beam 80 and is configured to convert the image beam 80 into a projection beam 90, so as to project the projection beam 90 onto a screen (not illustrated) to form an image frame.

In this way, by employing the wavelength conversion module 100 having good reliability and conversion efficiency, the projection device 200 can thus have good reliability and conversion efficiency as well.

In summary, the embodiments of the disclosure at least have one of the following advantages or effects. In the embodiments of the disclosure, by selecting the materials of the binder and the filling material of the wavelength conversion element, thermal conductivity, heat resistance and reliability of the wavelength conversion element can be improved. Moreover, in the wavelength conversion element, by the filling material that fills the cavities, good conversion efficiency of the wavelength conversion layer can be maintained. In addition, the wavelength conversion module and the projection device which use the above wavelength conversion element can thus have good reliability and conversion efficiency as well. In the forming method of a wavelength conversion element according to the embodiments of the disclosure, the wavelength conversion element formed by the manufacturing process in which the filling material is added can have good reliability and conversion efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion element, comprising:
   a binder;
   a wavelength conversion material dispersed in the binder to form a wavelength conversion layer;
   a filling material located in the wavelength conversion layer; and
   a plurality of cavities located in the wavelength conversion layer, wherein the filling material fills some of the plurality of the cavities.

2. The wavelength conversion element according to claim 1, wherein the other cavities contain air, and a volume percentage occupied by the cavities containing air in the wavelength conversion layer is 10% or lower.

3. The wavelength conversion element according to claim 1, wherein a refractive index of the filling material is greater than 1.

4. The wavelength conversion element according to claim 3, wherein a range of the refractive index of the filling material is from 1 to 1.8.

5. The wavelength conversion element according to claim 1, wherein a refractive index of the filling material is the same as a refractive index of the binder.

6. The wavelength conversion element according to claim 1, wherein a refractive index of the filling material is different from a refractive index of the binder.

7. The wavelength conversion element according to claim 1, wherein the binder contains silicon dioxide.

8. The wavelength conversion element according to claim 7, wherein a material of the filling material is the same as a material of the binder.

9. The wavelength conversion element according to claim 1, wherein thermal conductivity of the binder is greater than 0.2 W/m-k.

10. A forming method of a wavelength conversion element, the forming method comprising:
    providing a wavelength conversion material and a binder, wherein the wavelength conversion material is dispersed in the binder;
    curing the wavelength conversion material and the binder to form a wavelength conversion layer, wherein a plurality of cavities is formed in the wavelength conversion layer;
    injecting a filling material into the wavelength conversion layer to fill some of the cavities; and
    curing the filling material in the wavelength conversion layer.

11. The forming method of a wavelength conversion element according to claim 10, wherein the other cavities contain air, and a volume percentage occupied by the cavities containing air in the wavelength conversion layer is 10% or lower.

12. The forming method of a wavelength conversion element according to claim 10, wherein the step of injecting the filling material into the wavelength conversion layer comprises immersing the wavelength conversion layer in a solution containing the filling material.

13. The forming method of a wavelength conversion element according to claim 10, wherein the wavelength conversion layer is stuck to a substrate.

14. The forming method of a wavelength conversion element according to claim 10, wherein the binder contains silicon dioxide.

15. The forming method of a wavelength conversion element according to claim 14, wherein a material of the filling material is the same as a material of the binder.

16. The forming method of a wavelength conversion element according to claim 10, wherein thermal conductivity of the binder is greater than 0.2 W/m-k.

17. A wavelength conversion module, comprising:
    a substrate; and
    at least one wavelength conversion element, located on the substrate, and the at least one wavelength conversion element comprising:
    a binder;
    a wavelength conversion material dispersed in the binder to form a wavelength conversion layer;
    a filling material located in the wavelength conversion layer;
    a plurality of cavities located in the wavelength conversion layer, wherein the filling material fills some of the plurality of the cavities.

18. The wavelength conversion module according to claim 17, wherein the other cavities contain air, and a volume percentage occupied by the cavities containing air in the wavelength conversion layer is 10% or lower.

19. The wavelength conversion module according to claim 17, wherein a range of a refractive index of the filling material is from 1 to 1.8.

20. The wavelength conversion module according to claim 17, wherein thermal conductivity of the binder is greater than 0.2 W/m-k.

21. A projection device, comprising:
    a wavelength conversion module having at least one wavelength conversion optical region, and the wavelength conversion module comprising:
    a substrate; and
    at least one wavelength conversion element, wherein the at least one wavelength conversion element is located on the substrate and is disposed correspondingly on the at least one wavelength conversion optical region, wherein the at least one wavelength conversion element comprises a wavelength conversion material, a binder, a filling material and a plurality of cavities, wherein
    the wavelength conversion material is dispersed in the binder to form a wavelength conversion layer;
    the filling material is located in the wavelength conversion layer; and
    the plurality of the cavities are located in the wavelength conversion layer, wherein the filling material fills some of the plurality of the cavities;
    an excitation light source configured to emit an excitation beam, wherein the excitation beam is transmitted to the wavelength conversion module and is converted into an illumination beam through the wavelength conversion module;

a light valve located on a transmission path of the illumination beam and configured to convert the illumination beam into an image beam; and a projection lens located on a transmission path of the image beam and configured to convert the image beam into a projection beam.

22. The projection device according to claim 21, wherein the other cavities contain air, and a volume percentage occupied by the cavities containing air in the wavelength conversion layer is 10% or lower.

23. The projection device according to claim 21, wherein a range of a refractive index of the filling material is from 1 to 1.8.

24. The projection device according to claim 21, wherein the binder contains silicon dioxide.

25. The projection device according to claim 21, wherein thermal conductivity of the binder is greater than 0.2 W/m-k.

* * * * *